United States Patent [19]

Boston

[11] 4,413,286
[45] Nov. 1, 1983

[54] METHOD AND APPARATUS INVOLVING DIGITAL SCREEN GENERATION

[75] Inventor: William T. Boston, Melrose, Mass.

[73] Assignee: Optronics International, Inc., Chelmsford, Mass.

[21] Appl. No.: 295,573

[22] Filed: Aug. 24, 1981

[51] Int. Cl.³ .......................... H04N 1/40; H04N 1/22
[52] U.S. Cl. ...................................... 358/283; 358/298
[58] Field of Search ........................ 358/283, 298, 296

[56] References Cited

U.S. PATENT DOCUMENTS

4,149,194  4/1979  Holladay .............................. 358/298
4,350,996  9/1982  Rosenfield ............................. 358/75

*Primary Examiner*—Robert L. Griffin
*Assistant Examiner*—Edward L. Coles
*Attorney, Agent, or Firm*—Thompson, Birch, Gauthier & Samuels

[57] ABSTRACT

A method and apparatus involving the generation of a digital screen at different screen angles for reproducing an image in raster form as a series of adjacent picture elements disposed along a plurality of adjacent parallel lines. The digital screen is generated by the repetition of one screen cell in first and second directions, each cell being divided into a series of unique address locations and each location being characterized by a selected optical density value. A memory array is provided for storage of the optical density values at address locations which correspond to address locations in the digital screen. The digital values of the actual picture elements in the image, which are obtained by scanning of the image, are compared to the screen values stored in the memory at corresponding addresses in order to generate output data signals defining the image to be reproduced.

9 Claims, 9 Drawing Figures

FIG. 1B $\overline{OD} = \overline{OE} - \overline{BF}$ $= x \cos \theta - y \sin \theta$ $\overline{DC} = \overline{OD} \tan(90° - \alpha)$ $= + OD \cot \alpha$ $x' = OC = \dfrac{\overline{OD}}{\cos(90° - \alpha)} = \dfrac{\overline{OD}}{\sin \alpha}$ $x' = x \dfrac{\cos \theta}{\sin \alpha} - y \dfrac{\sin \theta}{\sin \alpha}$ $y' = \overline{DB} + \overline{BP} - \overline{DC} = \overline{EF} + \overline{BP} - \overline{DC}$

$y' = x \sin \theta + y \cos \theta - x \dfrac{\cos \theta \cos \alpha}{\sin \alpha} + y \dfrac{\sin \theta \cos \alpha}{\sin \alpha}$ $y' = \dfrac{\sin \theta \sin \alpha - \cos \theta \cos \alpha}{\sin \alpha} + y \dfrac{\cos \theta \sin \alpha + \sin \theta \cos \alpha}{\sin \alpha}$

$y' = -x \dfrac{\cos(\theta + \alpha)}{\sin \alpha} + y \dfrac{\sin(\theta + \alpha)}{\sin \alpha}$ $\dfrac{dx'}{dx} = \dfrac{\cos \theta}{\sin \alpha} \; ; \; \dfrac{dy'}{dy} = -\dfrac{\sin \theta}{\sin \alpha} \; ; \; \dfrac{dy'}{dy} = -\dfrac{\cos(\theta + \alpha)}{\sin \alpha} \; ; \; \dfrac{dy'}{dy} = \dfrac{\sin(\theta + \alpha)}{\sin \alpha}$ $\theta$: Angle between y and y'; positive if clockwise

METHOD AND APPARATUS INVOLVING DIGITAL SCREEN GENERATION

BACKGROUND OF THE INVENTION

I. Field of the Invention

The present invention relates to image reproduction and, more particularly, is directed towards a method and apparatus involving digital screen generation for reproducing an image.

II. Description of the Prior Art

The process of raster reproduction of continuous tone originals by a halftone representation is well known in the art. Generally, halftone processing utilizes line-by-line electrooptical scanning of the original in conjunction with optical screening techniques to produce halftone cells. A screen or mask having opaque rulings separating transmissive halftone cells are added optically to an image in order to form a resulting halftone image (U.S. Pat. No. 3,904,816). The optical halftone screen adds or multiplies the image, cell-by-cell, by its transmittance function. The combined image is reproduced as a halftone image on a photographic film. The size and shape of the halftone cells forming the final image is dependent upon the mask used, differing optical effects being dependent upon the screen used. The use of electronic screening techniques is disclosed in U.S. Pat. Nos. 3,961,132; 4,080,634 and 4,149,194.

SUMMARY OF THE INVENTION

It is an object of the present invention to provide a method and apparatus for digital screen generation, the screen being disposed at various angles.

Another object of the present invention is to provide a method and apparatus involving the generation of a digital screen at different screen angles for reproducing an image in raster form as a series of adjacent picture elements arranged in sequence along a plurality of adjacent parallel lines. A large area digital screen is generated by the repetition of one screen cell which is defined as an area within the screen that is bounded by two adjacent parallel lines in a first direction and two adjacent parallel lines in a second direction. Each cell is divided into a series of unique address locations, each location being characterized by a selected optical density value. The optical density values are stored in a memory array at address locations which represent address locations in the digital screen. Digital density values of the actual picture elements in the image to be reproduced are obtained by scanning of the image. The image density values are compared to the optical density values stored in the memory array in order to generate selected output data signals which define the type of image that is to be reproduced.

Other objects of the present invention will in part be obvious and will in part appear hereinafter.

The invention accordingly comprises the apparatus and process, together with their parts, steps, elements and interrelationships that are exemplified in the following disclosure, the scope of which will be indicated in the appended claims.

BRIEF DESCRIPTION OF THE DRAWINGS

A fuller understanding of the nature and objects of the present invention will become apparent upon consideration of the following detailed description taken in connection with the accompanying drawings, wherein.

DETAILED DESCRIPTION OF THE PREFERRED EMBODIMENTS

Figure 1:
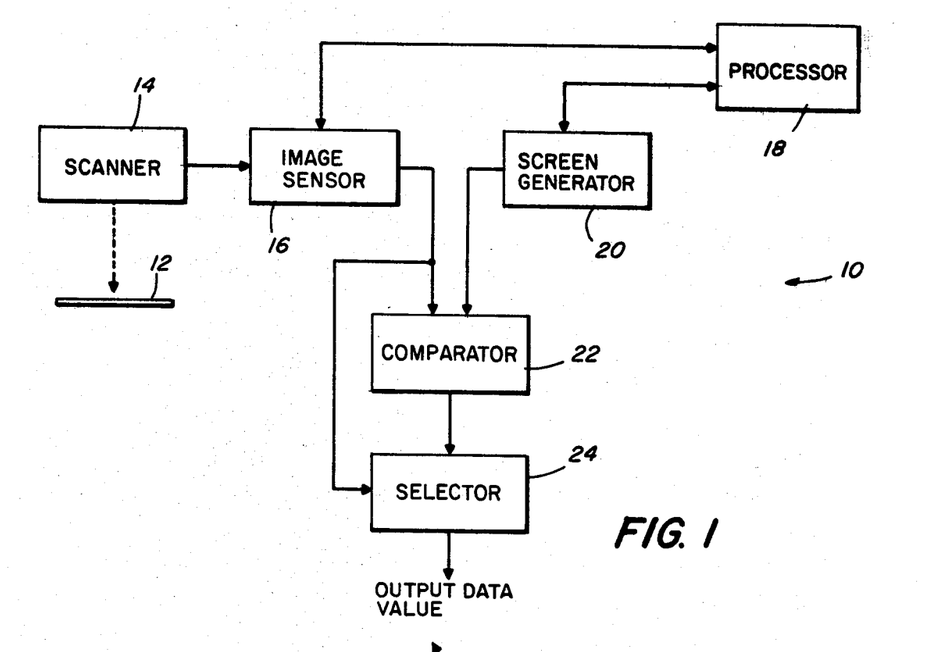
FIG. 1 is a block and schematic diagram of a system embodying the present invention.

Referring now to the drawings, particularly FIG. 1, there is shown a system 10 for reproducing an image 12 in raster form in accordance with the teachings of the present invention. System 10 includes a scanner 14 which optically scans image 12 and generates image signals that are sensed by an image sensor 16. Under the command of a processor 18, optical density image signals representing variations in optical density of image 12 generated by image sensor 16 and digital screen signals generated by a screen generator 20 are compared in a comparator 22. The digital screen signals represent a screen having a selected optical density pattern. Output data signals, which define the type of image that is to be reproduced, are presented at the output of a selector 24 which receives input signals from comparator 22 and image sensor 16.

The factors relating to the screen which determine the type of image to be reproduced include optical density screen values, screen frequency, screen angle and the printing method ultimately used. An increase in screen frequency improves resolution of the reproduction. Variations in screen angle produce different effects such as color separation. The method and apparatus involving digital screen generation taught by the present invention applies to the screening of images whether they be continuous-tone images or bi-level black and white graphics. As discussed herein, an image is reproduced in a raster form as a sequence of parallel adjacent lines with a sequence of adjacent picture elements or pixels disposed along each line. The teachings of this invention apply to the generation of screens for continuous-tone screened images used in gravure printing and bi-level half-tone images used in lithographic, relief and electrographic printing. The screens generated have parallel lines of symmetry in two dimensions.

Figure 1A:
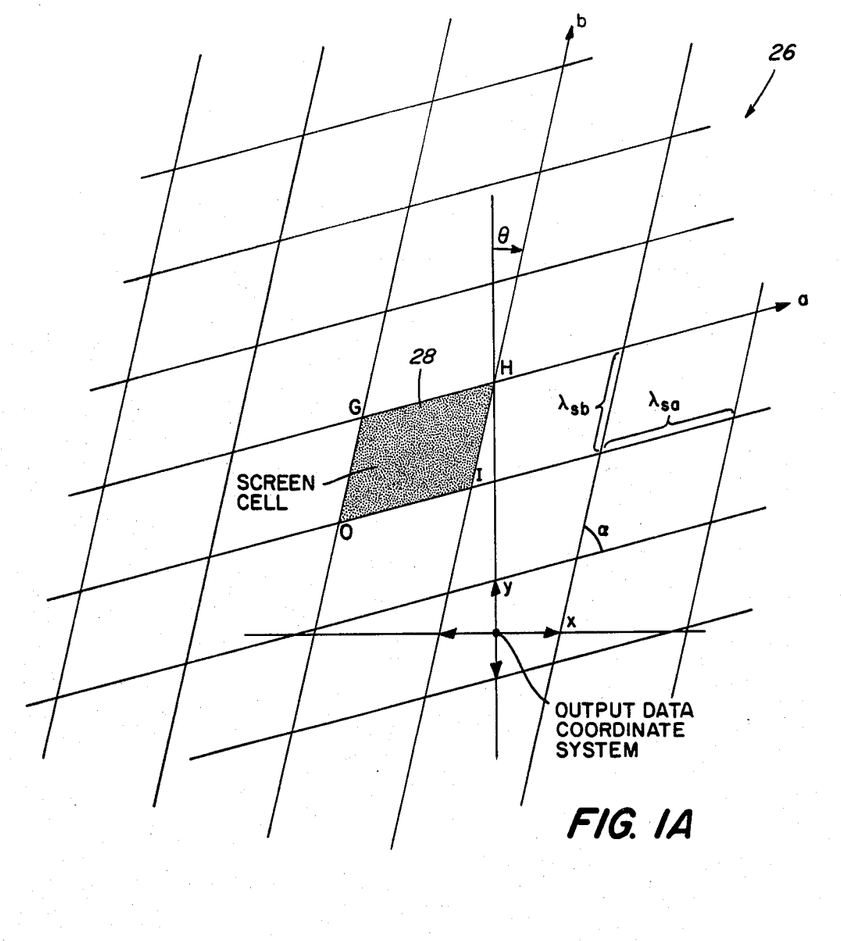
FIG. 1A is a diagrammatic representation of a digital screen illustrating certain principles of the present invention.

Referring now to FIG. 1A, there is shown a large area image screen 26 which is generated by the repetition of a screen cell 28 in directions a and b, the screen cell having a selected optical density pattern. As hereinafter described, cell 28, which is represented by the area denoted OGHI, is defined by a plurality of unique address locations, each address characterized by a selected optical density value. As used herein, screen cell area OGHI is the area included between two adjacent parallel lines in the direction a and two adjacent parallel lines in the direction b. Screen 26 is formed by the repetition of screen cell 28 in the direction a and in the direction b, the details of the screen cell 28 being shown in FIG. 2.

Figure 2:
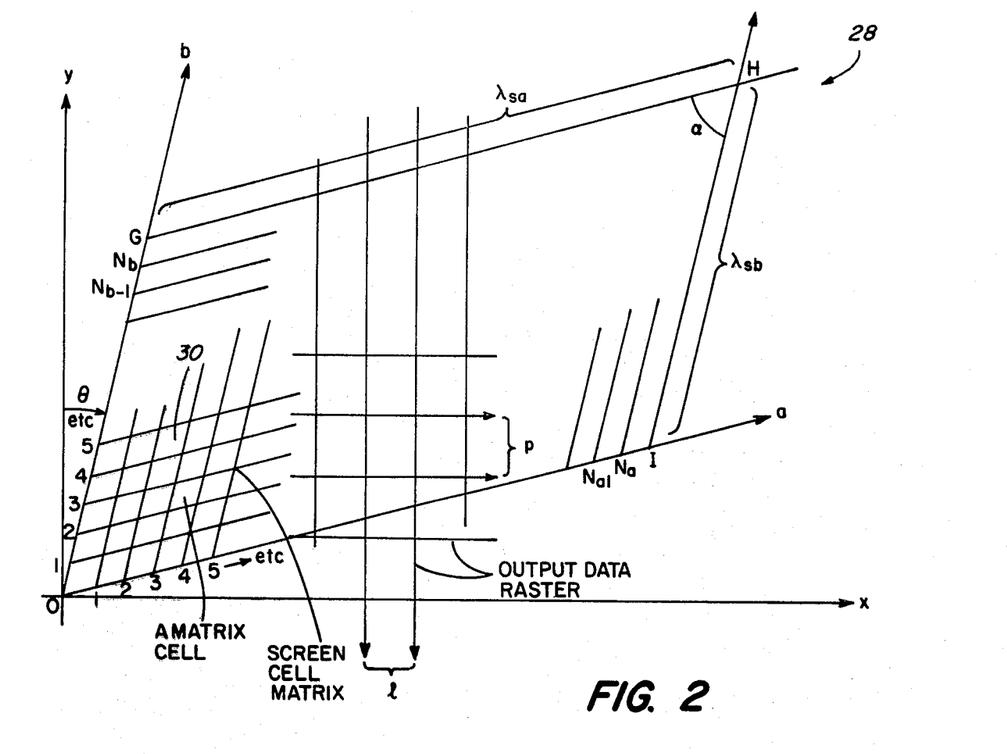
FIG. 2 is a diagrammatic representation of the screen cell of FIG. 1A.

The parameters denoted in FIGS. 1A and 2 are defined as follows:

$\theta$ - is the angle of the screen commonly given in graphic arts terminology as the angle between the principle axis of the screen and the viewer coordinate system (in this case, the output data coordinate system);

$\alpha$ - is the angle between the two axes of the screen cell 28 (normally, $\alpha$ is a right angle but, according to the present invention, $\alpha$ is any angle);

$\lambda_{sa}$ and $\lambda_{sb}$ - are the spatial frequences of the screen 26 in the $a$ and $b$ directions, respectively;

$l$ - is the distance between the adjacent scan lines of the output data raster;

$p$ - is the distance between the adjacent pixels of the output data raster;

$\lambda_{ma} = \frac{\lambda_{sa}}{N_a}$, $\lambda_{mb} = \frac{\lambda_{sb}}{N_b}$ - size of matrix cell in $a$ and $b$ directions, respectively;

$f_{sa} = \frac{1}{\lambda_{sa}}$, $f_{sb} = \frac{1}{\lambda_{sb}}$ - screen frequency (lines/inch) in $a$ and $b$ directions, respectively;

$f_p = \frac{1}{p}$ - pixel frequency;

$f_l = \frac{1}{l}$ - line frequency;

$N_a, N_b$ - number of matrix fields in $a$ and $b$ directions, respectively;

$A_a = \frac{a}{\lambda_{ma}} = \frac{aN_a}{\lambda_{sa}}$ - address of matrix cell in $a$ direction;

$A_b = \frac{a}{\lambda_{mb}} = \frac{aN_b}{\lambda_{sb}}$ - address of matrix cell in $b$ direction;

$N_p = \frac{y}{p}$ - current number of pixels; and $N_l = \frac{x}{l}$ - current number of lines.

Screen cell 28 is subdivided into a screen cell matrix 30, the size of the matrix being $N_a$ by $N_b$ in the a and b directions, respectively. A positive photographic image of the screen itself, without any other image exposure, produces an optical density measurement of the screen at each one of the matrix cell 30 positions. The value of this optical density is stored in a memory array 32 of size $N_aN_b$. Since screen 26 is merely the repetition of one screen cell 28, the density of the screen at any point in the image area is defined by the density value at corresponding address locations in memory 32. That is, by suitably addressing memory array 32, it is possible to assign a density value for each point in the image area using screen 26.

Figure 3:
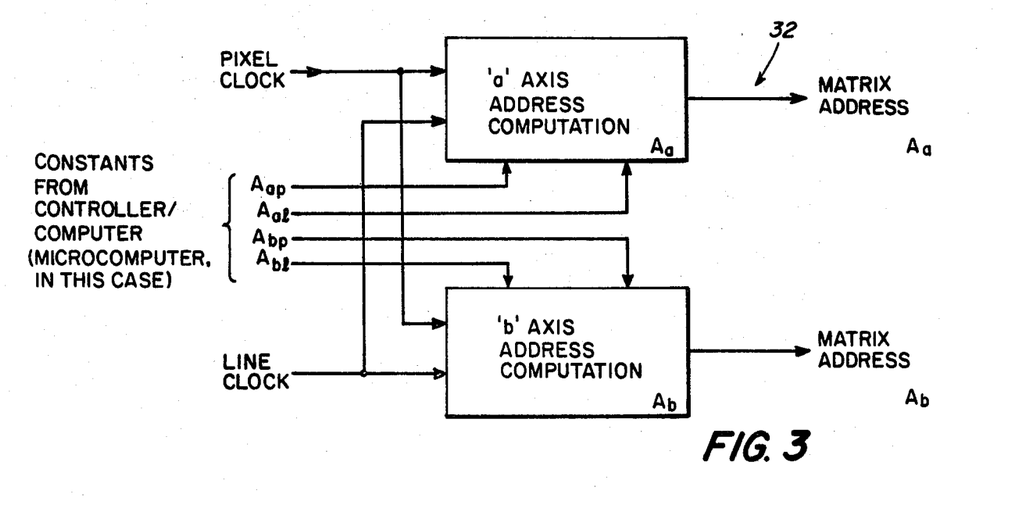
FIG. 3 is a diagrammatic representation of the address generation taught by the present invention.

As shown in FIG. 3, if, between the adjacent pixels, the memory array 32 address is incremented by the change of address $A_a$ per pixel ($\Delta A_{ap}$) and the change of address $A_b$ per pixel ($\Delta A_{bp}$), the contents of that location in the memory array 32 defines the effective density of the screen along a scan line. If the memory array 32 address is incremented by the change of address $A_a$ per line ($\Delta A_{al}$) and the change of address $A_b$ per line ($\Delta A_{bl}$), then the value of the screen on subsequent lines is determined.

Figure 1B:
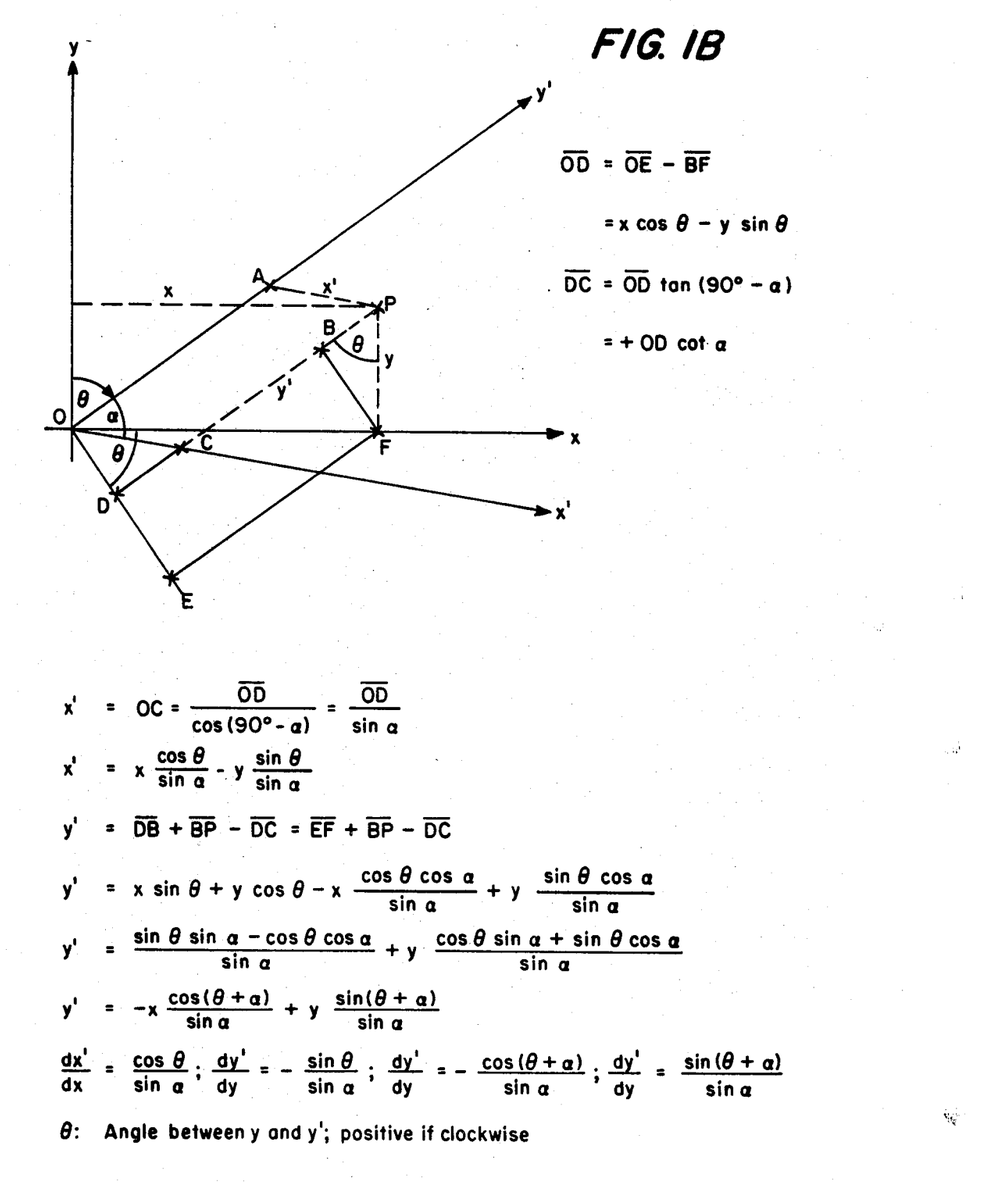
FIG. 1B is a diagrammatic representation of the transformation of the XY into the X'Y' coordinate system.

The change of address $A_{ap}$ and the change of address $A_{bp}$ and the change of address $A_{bl}$ and the change of address $A_{al}$ is obtained by substitution and utilization of the XY to X'Y' transformation shown in FIG. 1B as follows:

$$x = N_l l;\ y = N_p p;\ x' = \frac{\lambda_{sa}}{N_a} A_a;\ y' = \frac{\lambda_{sb}}{N_b} A_b$$

the result will be:

$$A_a = \frac{N_a}{\lambda_{sa}} \left( N_l l \frac{\cos \theta}{\sin \alpha} - N_p p \frac{\sin \theta}{\sin \alpha} \right)$$

$$A_b = \frac{N_b}{\lambda_{sb}} \left( -N_l l \frac{\cos(\theta + \alpha)}{\sin \alpha} + N_p p \frac{\sin(\theta + \alpha)}{\sin \alpha} \right)$$

Therefore, $$\frac{dA_a}{dN_p} = -p \frac{\sin \theta}{\sin \lambda} \cdot \frac{N_a}{sa}\text{ - change of address } A_a \text{ per pixel;}$$

$$\frac{dA_b}{dN_p} = p \frac{\sin(\theta + \lambda)}{\sin \lambda} \cdot \frac{N_b}{\lambda_{sb}}\text{ - change of address } A_b \text{ per pixel.}$$

$$\frac{dA_b}{dN_l} = -l \frac{\cos(\theta + \alpha)}{\sin \alpha} \cdot \frac{N_a}{\lambda_{sb}}\text{ - change of address } A_b \text{ per line;}$$

$$\frac{dA_a}{dN_l} = l \frac{\cos \theta}{\sin \alpha} \cdot \frac{N_a}{\lambda_{sa}}\text{ - change of address } A_a \text{ per line.}$$

or (if the terms 'screen frequencies', 'pixel frequency', and 'line frequency' are used rather than 'length of screen cell', 'pixel size', and 'line spacing'), then:

$$\frac{dA_a}{dN_p} = -\frac{\sin \theta}{\sin \alpha} \cdot \frac{N_a \cdot f_{sa}}{f_p} = \Delta A_{ap}\text{ - change of address } A_a \text{ per pixel;}$$

$$\frac{dA_b}{dN_p} = \frac{\sin(\theta + \alpha)}{\sin \alpha} \cdot \frac{N_b \cdot f_{sb}}{f_p} = \Delta A_{bp}\text{ - change of address } A_b \text{ per pixel;}$$

$$\frac{dA_b}{dN_l} = -\frac{\cos(\theta + \alpha)}{\sin \alpha} \cdot \frac{N_b \cdot f_{sb}}{f_l} = \Delta A_{bl}\text{ - change of address } A_b \text{ per line; and}$$

$$\frac{dA_a}{dN_l} = \frac{\cos \theta}{\sin \alpha} \cdot \frac{N_a \cdot f_{sa}}{f_l} = \Delta A_{al}\text{ - change of address } A_a \text{ per line}$$

Figure 4:
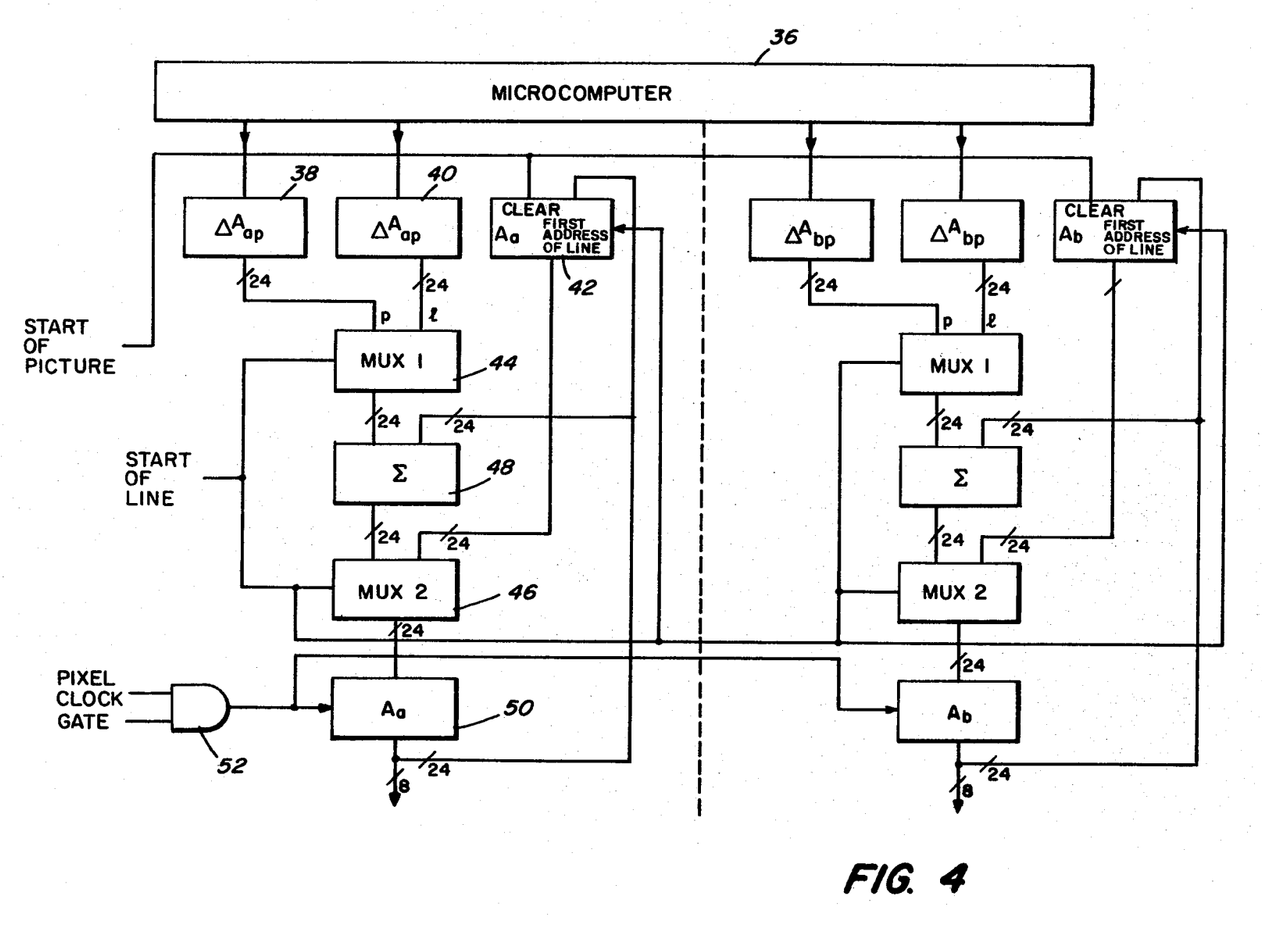
FIG. 4 is detailed block and schematic diagram of the address generation of FIG. 3.

A specific implementation of this address generation mechanism is shown diagrammatically in FIG. 4. The address $A_a$ and address $A_b$ computations are essentially identical and are shown on the left-hand and right-hand sides of the dotted line in FIG. 4. The following is directed to the left-hand side (the computation of $A_a$), but it will be readily appreciated that it applies equally to the computation of $A_b$.

In this specific implementation, the four $\Delta$ values are computed from the desired values of screen frequency and screen angle in a microcomputer 36 and those values are shown being transmitted from the microcomputer to registers 38 and 40. At the beginning of each picture, the first address of the line which is stored in a register 42 is cleared to zero. Then for each line, the $l$ inputs of multiplexers 44 and 46 are selected and a new first address of the line is computed by adding in an accumulator 48 the current first address of the line to $\Delta A_l$ and restoring the first address of line register 42 to the new value.

To increment the address at each pixel, the p inputs of multiplexers 44 and 46 are selected and the current address stored in accumulator 48 is incremented by $\Delta A_p$ at each pixel. In this specific implementation, the size of the screen cell matrix is 256 (the values of $N_a$ and $N_b$). The computation of the address has a 24-bit precision. The high order 8-bits of $A_a$ and $A_b$ generated from a register 50, which is gated by a clock 52, are used as the addresses of the screen cell memory array 32. The precision of the screen cell matrix computation is one part in $2^{16}$ which allows accurate screen generation over very large images.

The screen cell memory array address computation overflows, but this is inconsequential since the screen is modulo 256. The value of the contents at each address location in memory array 32 represents the effective density of the screen at the address location corresponding to the address location of the pixel in the image.

Figure 5:
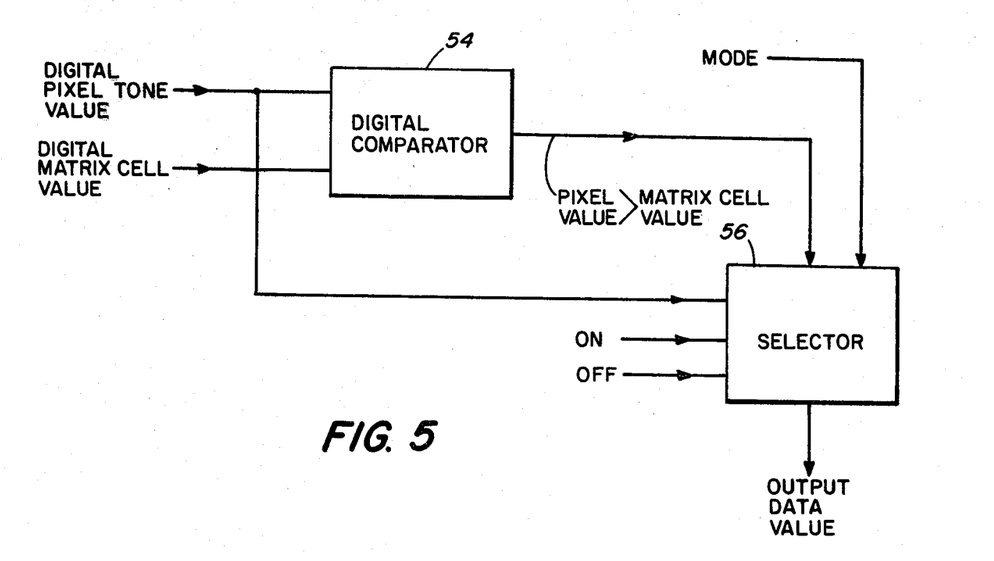
FIG. 5 is a block and schematic diagram of the digital comparator and selector of FIG. 1.

Referring now to FIG. 5, the digital value of the actual pixel at each location in the image is compared in a comparator 54 to the screen values stored in memory array 32 at corresponding locations. A selector 56 receives the signal from comparator 54 and generates output data signals which define the image to be reproduced. If the image value is greater than the matrix cell value, the output data signals from selector 56 are dependent upon the type of screen that is to be produced. In the case of a halftone screen, the output data value is set to a maximum or black pixel. In the case of a gravure screen, the value of the output pixel is set to be equal to the image pixel tone value thereby generating a screened continuous-tone image that can be used in etching of gravure printing cylinders. A chaining effect is obtained by having the cells touch at 20% of the maximum density in the X direction and at 30% of the maximum density in the Y direction.

Figure 6:
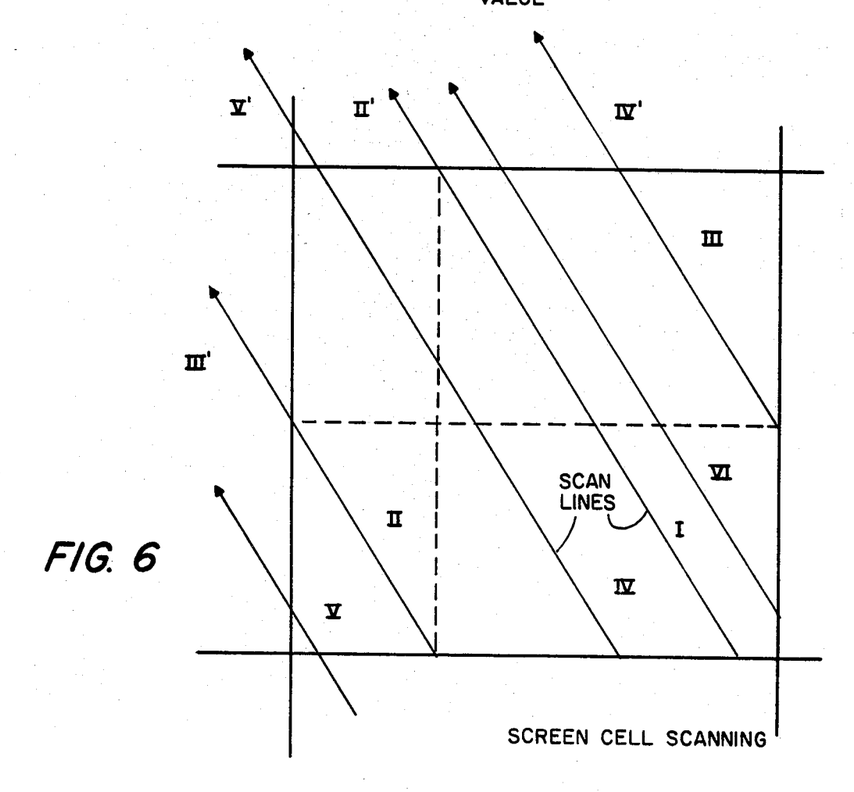
FIG. 6 is a schematic diagram illustrating the scanning of the screen cell of FIG. 2.
Figure 7:
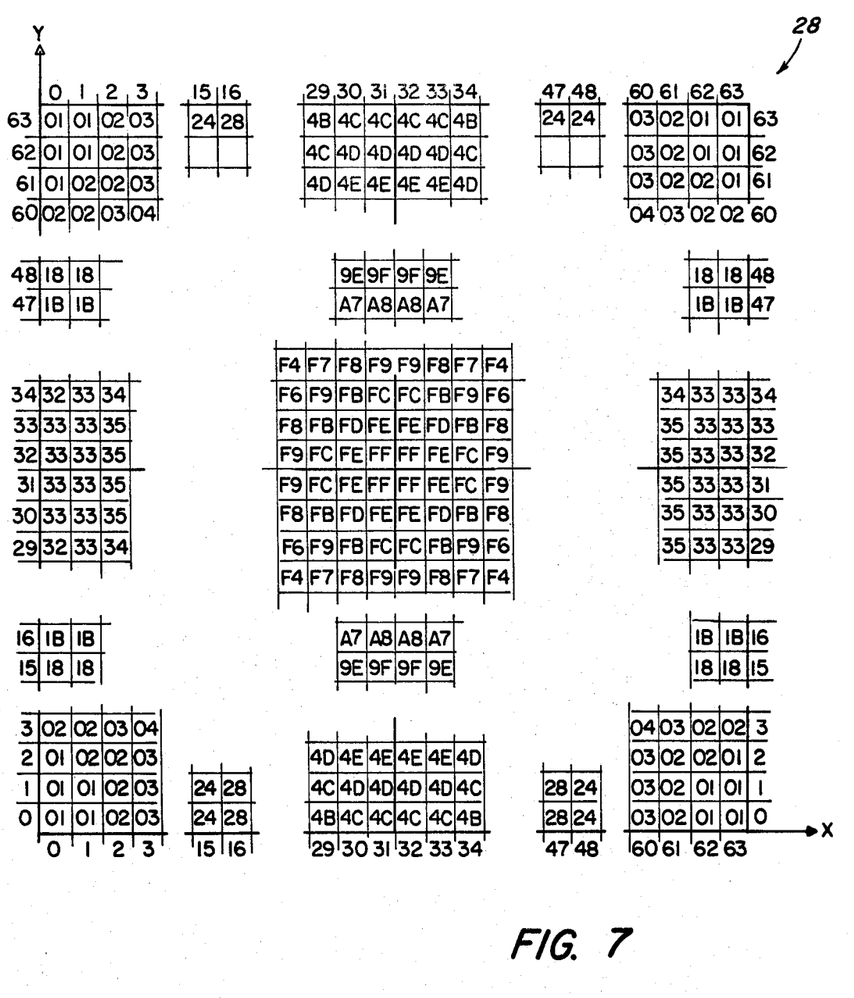
FIG. 7 is a schematic illustration of density values in the screen cell of FIG. 1A.

FIG. 6 shows the scanning sequence of an individual screen cell 28 in order to provide the optical density values at selected address locations of digital screen 26 for comparison with the actual pixel at corresponding locations in the image. In the illustrated embodiment, the intersection of a scan line and boundary of screen cell 28 determines the starting point of the next scan line which is on the opposite boundary. That is, the starting point of scan line II on the lower boundary of screen cell 28 is opposite the intersection of scan line I on the upper boundary of the screen cell. FIG. 7 is a partial map of the density values of a typical screen cell 28 and shows a substantially sinusoidal profile. In the illustrated embodiment, by way of example, screen cell 28 is symmetrical about its center. In an alternate embodiment, screen cell 28 is not symmetrical about its center.

Since certain changes may be made in the foregoing disclosure without departing from the scope of the invention herein involved, it is intended that all matter contained in the above description and depicted in the accompanying drawings be construed in an illustrative and not in a limiting sense.

What is claimed is:

1. A method of reproducing an image comprising the steps of:
   (a) scanning an image to be reproduced;
   (b) generating first optical density values at selected address locations of said scanned image;
   (c) generating a screen cell having a selected optical density pattern with second optical density values at selected address locations, a map of said second optical density values having a sinusoidal profile;
   (d) repeating said screen cell in first and second directions to form a large area screen having a repetition of said second optical density values at selected address locations;
   (e) comparing said first and second optical density values at corresponding address locations; and
   (f) generating output data signals representing said comparison and defining a reproduction of said image to be reproduced.

2. The method of reproducing an image as claimed in claim 1 wherein the profile of a map of said second optical density values is substantially sinusoidal.

3. The method of reproducing an image as claimed in claim 1 including the step of storing said second optical density values in a memory array having address locations corresponding to said address locations of said scanned image.

4. The method of reproducing an image as claimed in claim 3 including the step of subdividing said screen cell into a screen cell matrix having a series of parallel lines, selected points along each of said lines having a unique address location, certain ones of said parallel lines being in a first direction and certain other ones of said lines being in a second direction.

5. An apparatus for reproducing an image in raster form as a series of adjacent picture elements disposed along a plurality of adjacent parallel lines comprising:
   (a) scanner means for optically scanning an image to be reproduced and for generating image signals at selected address locations;
   (b) image sensor means operatively connected to said scanner means for generating optical density signals representing variations in the optical density of said image;
   (c) screen cell generating means for generating a screen cell having an optical density pattern of selected optical density values at designated address locations;
   (d) memory means operatively connected to said screen cell generating means for storing said optical density values at designated address locations;
   (e) a processor operatively connected to said memory means for incrementally addressing said memory means in steps corresponding to address differences between designated address locations of said optical density pattern;
   (f) comparator means operatively connected to said image sensor means and said memory means for comparing said image signals and said optical density values at corresponding address locations; and
   (g) output means operatively connected to and responsive to said comparator means for generating output data signals representing the image to be reproduced.

6. The apparatus as claimed in claim 5 wherein said processor incrementally addresses said memory means in steps in first and second directions, said steps defining an address difference between adjacent picture elements and an address difference between adjacent parallel lines.

7. A method of reproducing an image comprising the steps of:
   (a) scanning an image to be reproduced;
   (b) generating first optical density values at selected address locations of said scanned image;
   (c) generating a screen cell having a selected optical density pattern with second optical density values at selected address locations;
   (d) storing said second optical density values in a memory array having address locations corresponding to said address locations of said scanned image;
(e) subdividing said screen cell into a screen cell matrix having a series of parallel lines, selected points along each of said lines having a unique address location, certain ones of said parallel lines being in a first direction and certain other ones of said lines being in a second direction;
(f) incrementally addressing said memory array in steps representing an address difference between selected ones of said points and an address difference between selected ones of said parallel lines;
(g) repeating said screen cell in first and second directions to form a large area screen having a repetition of said second optical density values at selected address locations;
(h) comparing said first and second optical density values at corresponding address locations; and
(i) generating output data signals representing said comparison and defining a reproduction of said image to be reproduced.

8. A method of reproducing an image comprising the steps of:
(a) scanning an image to be reproduced;
(b) generating first optical density values at selected address locations of said scanned image;
(c) generating a screen cell having a selected optical density pattern with second optical density values at selected address locations;
(d) storing said second optical density values in a memory array having address locations corresponding to said address locations of said scanned image;
(e) subdividing said screen cell into a screen cell matrix having a series of parallel lines, selected points along each of said lines having a unique address location, certain ones of said parallel lines being in a first direction and certain other ones of said lines being in a second direction;
(f) incrementally addressing said array memory in said first direction in steps representing an address difference between selected ones of said points and an address difference between selected ones of said parallel lines and in said second direction in steps representing an address difference between selected ones of said points and an address difference between selected ones of said parallel lines;
(g) repeating said screen cell in first and second directions to form a large area screen having a repetition of said second optical density values at selected address locations;
(h) comparing said first and second optical density values at corresponding address locations; and
(i) generating output data signals representing said comparison and defining a reproduction of said image to be reproduced.

9. A method of generating a digital screen for reproducing an image in raster form as a series of adjacent picture elements disposed along a plurality of adjacent lines, said method comprising the steps of:
(a) generating a screen cell having a selected optical density pattern with selected optical density values at designated address locations;
(b) subdividing said screen cell into a screen cell matrix characterized by a series of parallel lines, selected points along each said line having unique address locations;
(c) storing said screen cell in a memory array at address locations corresponding to said designated address locations; and
(d) incrementally addressing said memory array in steps representing an address difference between selected ones of said points and an address difference between selected ones of said lines, said memory array being incrementally addressed in a first direction in steps representing an address difference between selected ones of said points and an address difference between selected ones of said parallel lines and in a second direction in steps representing an address difference between selected ones of said points and an address difference between selected ones of said parallel lines.

* * * * *